United States Patent [19]
Inagaki et al.

[11] Patent Number: 5,752,387
[45] Date of Patent: May 19, 1998

[54] AIR-FUEL RATIO CONTROL SYSTEM FOR AUTOMOTIVE VEHICLE EQUIPPED WITH AN AIR CONDITIONER

[75] Inventors: Mitsuo Inagaki, Okazaki; Kenji Kanehara, Toyohashi; Hideaki Sasaya; Mikio Matsuda, both of Okazaki; Yasushi Yamanaka, Nakashima-gun, all of Japan

[73] Assignee: Nippon Soken Inc., Aichi-ken, Japan

[21] Appl. No.: 503,969

[22] Filed: Jul. 19, 1995

[30] Foreign Application Priority Data

Jul. 20, 1994 [JP] Japan .................................. 6-168078
May 15, 1995 [JP] Japan .................................. 7-115969

[51] Int. Cl.$^6$ .................................. F02D 1/02
[52] U.S. Cl. .................. 62/133; 62/323.1; 123/339.17; 60/276
[58] Field of Search .................. 62/133, 323.1, 62/323.4, 228.4, 228.5; 417/34; 60/276; 123/339.17

[56] References Cited

U.S. PATENT DOCUMENTS

| | | | |
|---|---|---|---|
| 4,836,164 | 6/1989 | Morozumi et al. | 123/339.17 |
| 4,898,005 | 2/1990 | Sakurai | 62/115 |
| 4,976,589 | 12/1990 | Ide | 417/34 |
| 5,163,399 | 11/1992 | Bolander et al. | 62/228.5 X |
| 5,216,880 | 6/1993 | Aoki et al. | 60/267 |

FOREIGN PATENT DOCUMENTS

| | | |
|---|---|---|
| 1271645 | 10/1989 | Japan . |
| 25721 | 1/1990 | Japan . |
| 25735 | 1/1990 | Japan . |
| 249938 | 2/1990 | Japan . |
| 291438 | 3/1990 | Japan . |
| 412146 | 1/1992 | Japan . |

*Primary Examiner*—Harry B. Tanner
*Attorney, Agent, or Firm*—Cushman Darby & Cushman IP Group of Pillsbury Madison & Sutro LLP

[57] ABSTRACT

An air-fuel ratio control system for an internal combustion engine of an automotive vehicle is provided which is designed to enrich an air-fuel mixture when an engine load is varied by use of an air conditioner installed in the vehicle for ensuring optimum emission control. The air-fuel ratio control system includes an air conditioner condition determining unit which determines drive torque of an air conditioner compressor as a parameter indicative of a variation in engine load and modifies an air-fuel ratio to the rich side according to an increase in drive torque of the air conditioner compressor.

4 Claims, 9 Drawing Sheets

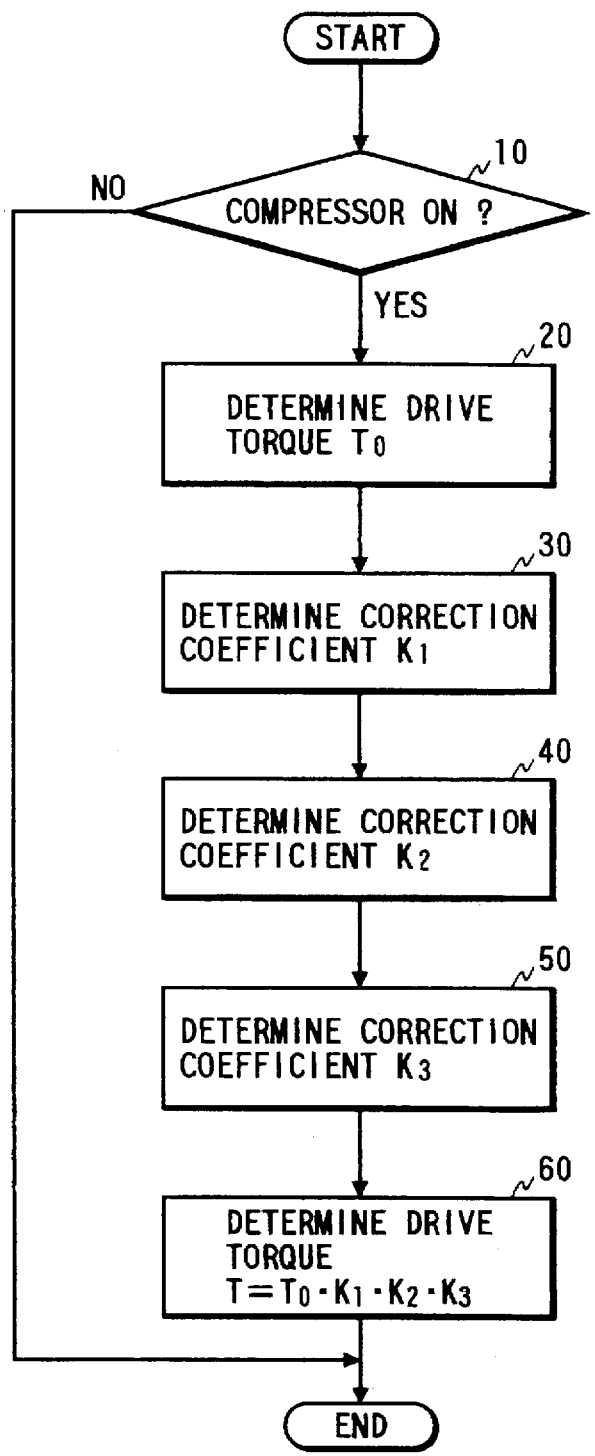

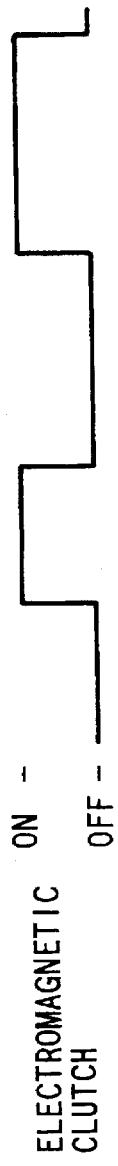
FIG. 6(a) ELECTROMAGNETIC CLUTCH ON/OFF
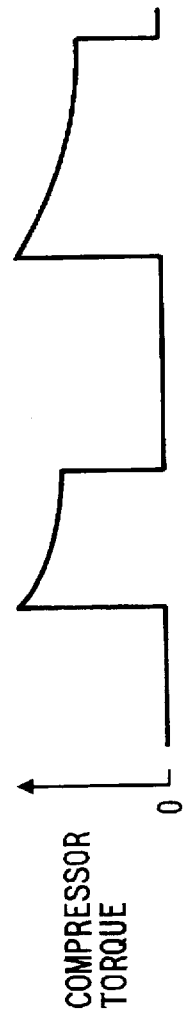
FIG. 6(b) COMPRESSOR TORQUE
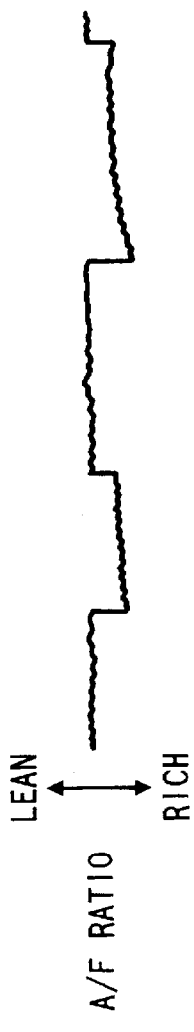
FIG. 6(c) A/F RATIO LEAN/RICH
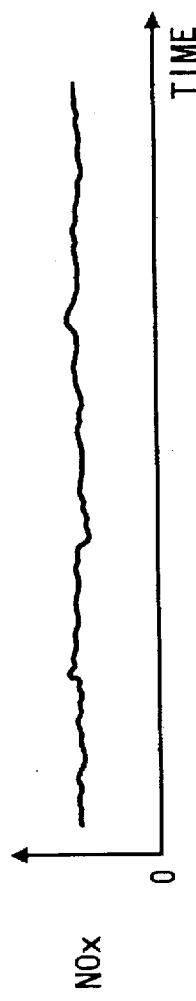
FIG. 6(d) NOx vs TIME

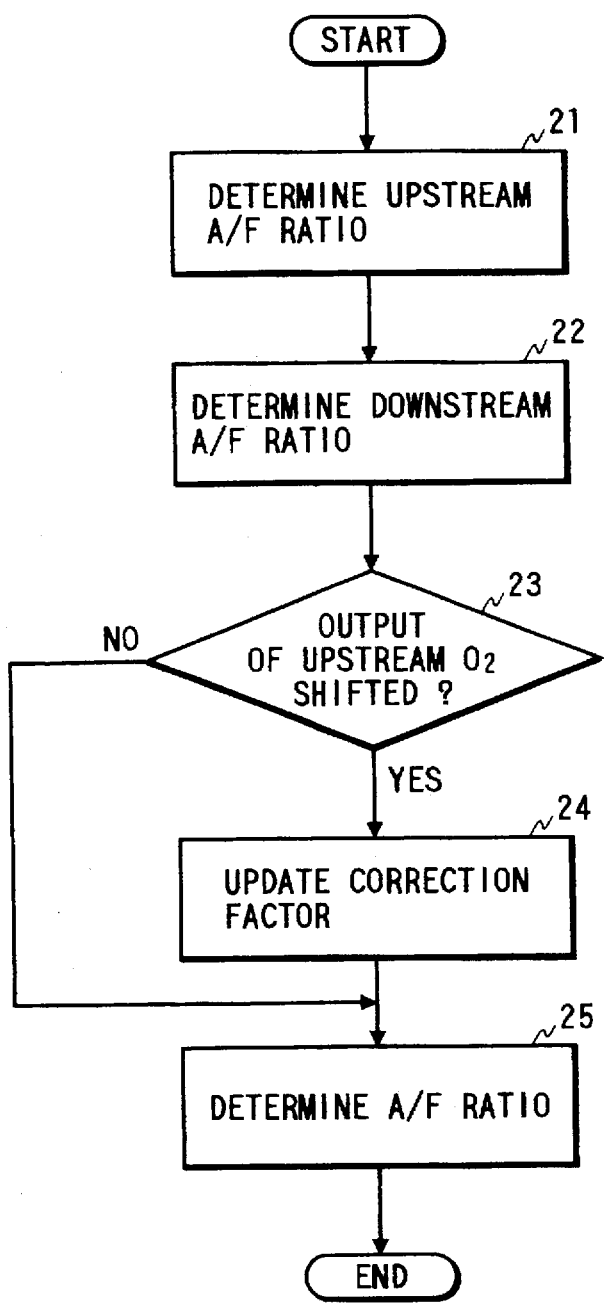

AIR-FUEL RATIO CONTROL SYSTEM FOR AUTOMOTIVE VEHICLE EQUIPPED WITH AN AIR CONDITIONER

BACKGROUND OF THE INVENTION

1. Technical Field

The present invention relates generally to an air-fuel ratio control system for an internal combustion engine of an automotive vehicle, and more particularly to an air-fuel ratio control system which is designed to modify an air-fuel ratio when an engine load is varied by use of an air conditioner installed in the vehicle for ensuring optimum emission control.

2. Background Art

Japanese Patent First Publication No. 2-91438 teaches air/fuel ratio control when an engine load is increased by use of an air conditioner mounted in an automotive vehicle. In the air-fuel ratio control, the degree to which an air-fuel ratio of a mixture supplied to an engine is modified to the lean side, is changed according to the amount of time after the engine is brought into low load conditions to decrease fuel supply efficiency for preventing engine output characteristics from being degraded. This is based on the fact that if the engine is maintained at low load conditions for a long time, an amount of fuel adhering to an inner wall of an inlet pipe which enters a combustion chamber is usually decreased.

Japanese Patent First Publication No. 4-12146 discloses an air-fuel ratio control system which determines a correction value and a correction control time for varying an air-fuel ratio to the rich side as a function of temperature, i.e., according to an increase in engine load. This is based on the fact that if an engine load is increased in a cold condition immediately after the engine starts, the air-fuel ratio is not enriched sufficiently.

The above prior art engine control systems, however, encounter a drawback in that when driving torque for an air conditioner is changed transitionally, that is, when a compressor of the air conditioner is turned on and off intermittently, it is difficult to modify an air-fuel ratio to a desired value for stable emission control.

SUMMARY OF THE INVENTION

It is therefore a principal object of the present invention to avoid the disadvantages of the prior art.

It is another object of the present invention to provide an air-fuel ratio control system for an engine of an automotive vehicle which is designed to ensure optimum emission control even when an air conditioner is in operation.

According to one aspect of the present invention, there is provided an engine control apparatus for controlling an air-fuel ratio of an air-fuel mixture supplied to an engine during use of an air conditioner mounted on an automotive vehicle which comprises an air-fuel ratio determining means for determining an air-fuel ratio of the air-fuel mixture supplied to the engine, a fuel supply means for supplying fuel to the engine so as to meet a given air-fuel ratio, an air conditioner operating condition determining means for determining drive torque of a compressor used in the air conditioner driven by the engine during use of the air conditioner, and a control means for controlling the fuel supply means to enrich the air-fuel mixture supplied to the engine so as to modify the air-fuel ratio determined by the air-fuel ratio determining means to a target richer air-fuel ratio according to an increase in drive torque of the compressor determined by the air conditioner operating condition determining means, produced by an increase in load of the engine during use of the air conditioner.

In the preferred mode of the invention, the air conditioner operating condition determining means determines the drive torque of the compressor in a given relation to a current value supplied to an air blower disposed in the air conditioner and corrects the determined drive torque based on at least one of parameters indicative of an air temperature cooled by the air conditioner, an outside air temperature, and an engine speed, and wherein the control means enriches the air-fuel mixture supplied to the engine according to an increase in the corrected drive torque of the compressor.

An upstream oxygen sensor and a downstream oxygen sensor may be provided. The upstream oxygen sensor monitors the concentration of oxygen contained in an exhaust gas upstream of a catalytic converter, while the downstream oxygen sensor monitors the concentration of oxygen contained in an exhaust gas downstream of the catalytic converter. The control means determines an air-fuel ratio correction factor based on the concentrations of oxygen monitored by the upstream and downstream oxygen sensors and modifies a supply of fuel to the engine based on the correction factor.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 2 is a flowchart which shows a program performed by an air conditioner operating condition detecting circuit;

FIGS. 3($b$) to ($d$) are graphs which show the relations correction coefficients $K_1$, $K_2$, and $K_3$ used in determining drive torque of an air conditioner compressor and an cooled air temperature, an outside air temperature, and an engine speed, respectively;

FIGS. 6($c$) and 6($d$) are time charts which show variations in air-fuel ratio and NOx contained in an exhaust gas, respectively;

FIG. 8 is a flowchart which shows a program performed by a two-$O_2$ sensor system.

DESCRIPTION OF THE PREFERRED EMBODIMENT

Figure 1:
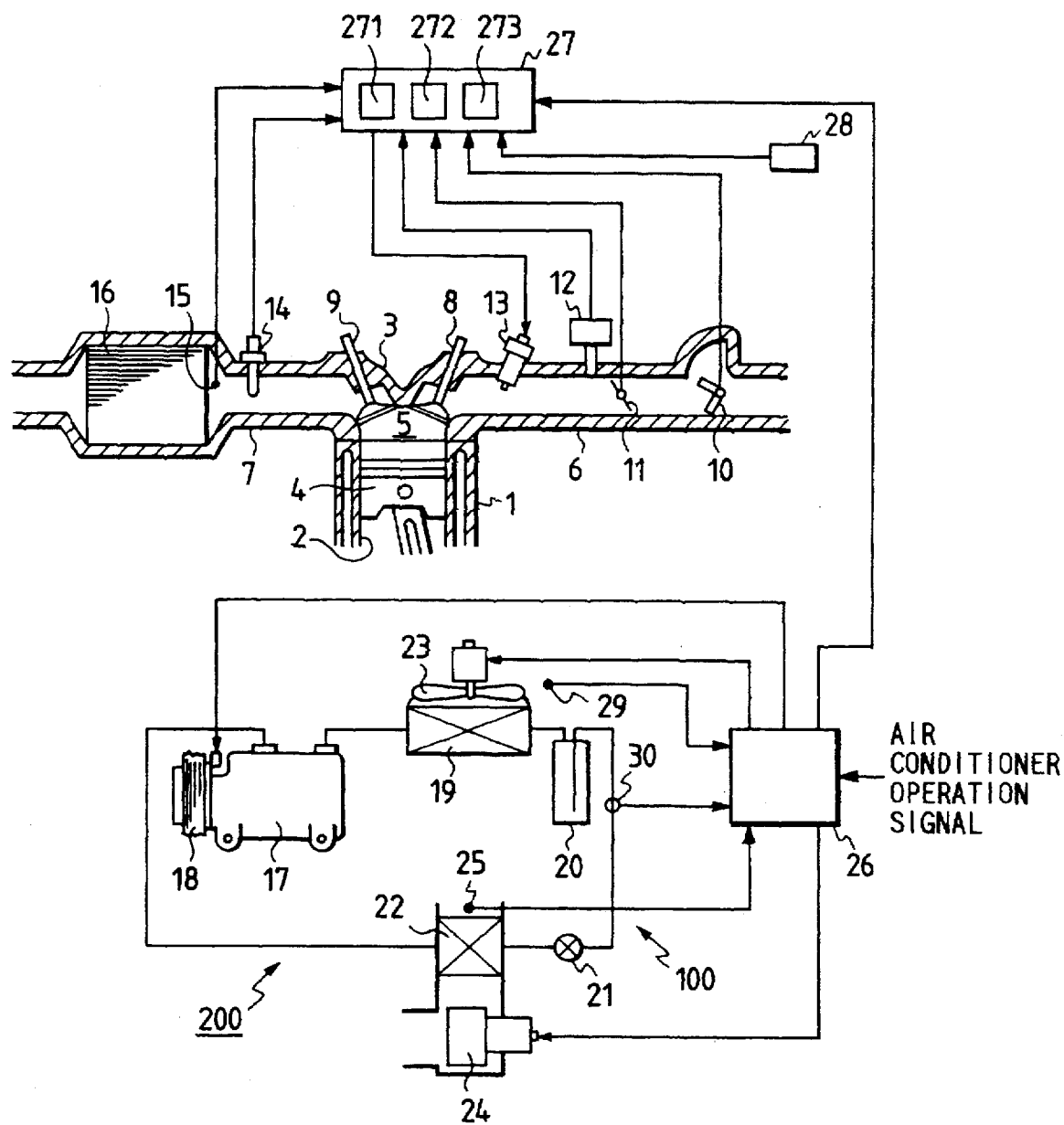
FIG. 1 is a schematic diagram which shows the entire structure of an air-fuel ratio control system for an automotive vehicle according to the present invention.

Referring now to the drawings, particularly to FIG. 1, there is shown an air-fuel ratio (A/F) control system for an internal combustion engine of an automotive vehicle according to the present invention.

An engine 1 has a cylinder 2, a cylinder head 3, a piston 4, and a combustion chamber 5. An intake pipe 6 supplies air to the combustion chamber 5. An exhaust pipe 7 discharges exhaust gas from the combustion chamber 5. In the combustion chamber 5, an intake valve 8 and an exhaust valve 9 are arranged. In the intake pipe 6, an airflow meter 10, a throttle valve 11, a negative pressure sensor 12, and an injector 13 are disposed. The airflow meter 10 measures the amount of intake air introduced into the combustion chamber 5 to provide a signal indicative thereof to an engine control unit (ECU) 27. The throttle valve 11 is located downstream of the airflow meter 10, and serves to modify the amount of intake air supplied to the combustion chamber 5. The negative pressure sensor 12 is located downstream of the throttle valve 11, and measures an negative pressure of the intake air to provide a signal indicative thereof to the ECU 27. The injector 13 injects fuel into the combustion chamber 5.

In the exhaust pipe 7, an oxygen sensor 14, an exhaust gas temperature sensor 15, and a three way catalytic converter 16 are disposed. The oxygen sensor 14 measures the concentration of residual oxygen in an exhaust gas, and provides a signal indicative thereof to the ECU 27. The exhaust gas temperature sensor 15 is located downstream of the oxygen sensor 14, and measures the temperature of the exhaust gas to provide a signal indicative thereof to the ECU 27. The three way catalytic converter 16 is located downstream of the exhaust gas temperature sensor 15, and purges CO, HC, and NOx contained in the exhaust gas simultaneously.

An air conditioner 200 includes an air conditioner compressor 17 and an air conditioning cycle system 100. The air conditioner compressor 17 has an electromagnetic clutch 18, and is actuated by part of engine power transmitted through a V-belt (not shown). The air conditioning cycle system 100 is connected to the air conditioner compressor 17. The air conditioning cycle system 100 has disposed along refrigerant flow a condenser 19, a reservoir tank 20, and an expansion valve 21, and an evaporator 22. The condenser 19 incorporates therein a motor-driven cooling fan 23. The evaporator 22 incorporates therein a motor-driven air blower 24 and a cooled air temperature sensor 25 for measuring the temperature of cooled air circulating through the air conditioning cycle system 100. A refrigerant pressure sensor 30 is disposed downstream of the reservoir tank 20, and measures the pressure of refrigerant.

An air conditioner electronic control unit (ECU) 26 receives an air conditioner operation signal provided by an operator of the vehicle, and provides on-off motor control signals to the cooling fan 23 and the air blower 24. The cooling fan 23 and the air blower 24 are turned on when a signal level provided by the refrigerant pressure sensor 30 exceeds a given value, while they are turned off when the signal level is decreased below the given value. The air conditioner ECU 26 is also responsive to an output signal from the cooled air temperature sensor 25 to provide on-off signals to the electromagnetic clutch 18 built in the air conditioner compressor 17.

The ECU 27 includes an air-fuel ratio determining circuit 271, a fuel supply control circuit 272, and an air conditioner operating condition detecting circuit 273. The air-fuel ratio determining circuit 271 is responsive to output signals from the oxygen sensor 14 and the exhaust gas temperature sensor 15 to determine an air-fuel ratio of air/fuel mixture supplied to the engine 1. The fuel supply control circuit 272 determines based on outputs from the airflow meter 10 and an engine speed sensor 28 a supply of fuel required for the engine 1 to be driven at a desired air-fuel ratio determined by the air-fuel ratio determining circuit 271, and controls the length of time the injector 13 is to be opened. The air conditioner operating condition detecting circuit 273 determines drive torque of the compressor 17 during use of the air conditioner 200 based on the on-off signal outputted to the electromagnetic clutch 18, the on-off motor control signal outputted to the air blower 24, cooled air temperature data derived by the cooled air temperature sensor 25, ambient temperature data indicative of an air temperature outside a vehicle cabin detected by an outside air temperature sensor 29, and engine speed data derived by the engine speed sensor 28.

Referring to FIG. 2, there is shown a flowchart of a program or sequence of logical steps performed by the air conditioner operating condition detecting circuit 273.

After entering the program, the routine proceeds to step 10 wherein it is determined whether the compressor 17 is turned on or off by monitoring the on-off signal supplied to the electromagnetic clutch 18. If a NO answer is obtained meaning that the compressor 17 is turned off, then the routine terminates. Alternatively, if a YES answer is obtained, then the routine proceeds to step 20 wherein the on-off motor control signal corresponding to the amount of air flow produced by the air blower 24 is monitored to determine drive torque $T_o$ of the compressor 17 by look-up using mapped data, as will be described later in detail.

Subsequently, the routine proceeds to step 30 wherein the temperature of cooled air is determined based on an output from the cooled air temperature sensor 25 to derive a correction coefficient $K_1$ by look-up using mapped data, as will also be described later. The routine then proceeds to step 40 wherein the outside temperature is determined based on an output from the outside air temperature sensor 29 to derive a correction coefficient $K_2$ in a similar manner to that in step 30. The routine then proceeds to step 50 wherein the engine speed is determined based on an output from the engine speed sensor 28 to derive a correction coefficient $K_3$ in a similar manner to that in step 30. The routine then proceeds to step 60 wherein drive torque T of the air conditioner compressor 17 during use of the air conditioner 200 is mathematically projected by multiplying the drive torque $T_0$ by the correction coefficients $K_1$, $K_2$, and $K_3$ ($T=T_0 \cdot K_1 \cdot K_2 \cdot K_3$).

The fuel supply control circuit 272 receives the signal indicative of the drive torque of the air conditioner compressor 17 outputted from the air conditioner operating condition detecting circuit 273, and increases the amount of fuel injected by the injector 13 into the combustion chamber 5 so as to modify an air-fuel ratio to the rich side by an amount corresponding to an increase in drive torque of the air conditioner compressor 17. If the air-fuel ratio does not reach a richer target value, the ECU 27 feeds an output signal from the air-fuel ratio determining circuit 271 back to the fuel supply control circuit 272 through a feedback control loop to correct a supply of fuel injected by the injector 13.

FIGS. 3(a) to 3(d) show experimentally determined maps used by the air conditioner operating condition detecting circuit 273 in determining the drive torque T of the air conditioner compressor 17.

Figure 3A:
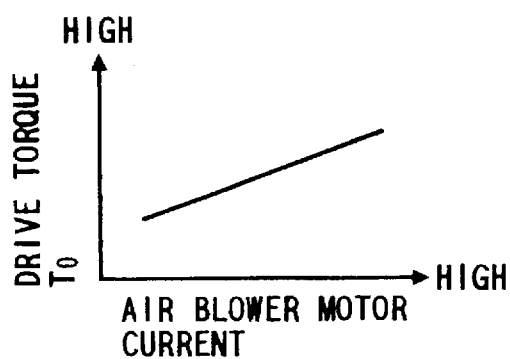
FIG. 3($a$) is a graph which shows the relation between drive torque of an air conditioner compressor and a motor current supplied to an air blower of an air conditioner.
Figure 3B:
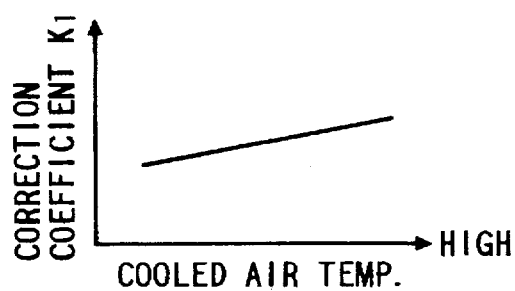
Figure 3C:
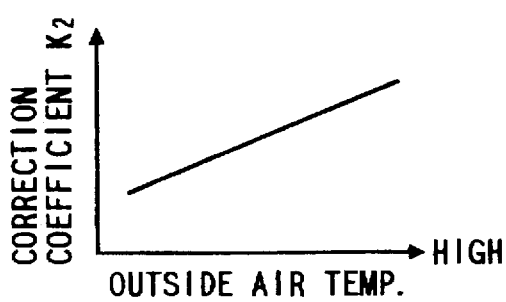
Figure 3D:
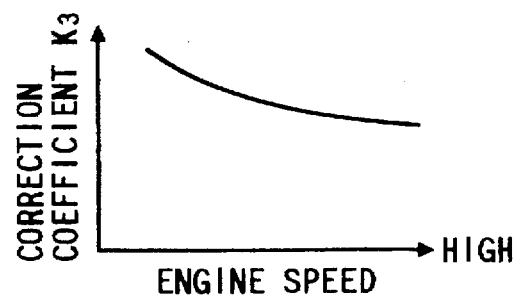

FIG. 3(a) illustrates the relation between the drive torque $T_O$ and the motor current (i.e., the motor control signal) supplied to the air blower 24, and shows that the drive torque $T_0$ is increased in proportion to an increase in motor current. FIGS. 3(b) and 3(c) illustrate the relations between the correction coefficient $K_1$ and the cooled air temperature monitored by the cooled air temperature sensor 25 and between the correction coefficient $K_2$ and the outside temperature monitored by the outside air temperature sensor 29, respectively, and show that the correction coefficients $K_1$ and $K_2$ are increased in proportion to increases in cooled air temperature and outside temperature. FIG. 3(d) illustrates the relation between the correction coefficient K3 and the engine speed monitored by the engine speed sensor 28, and shows that the correction coefficient $k_3$ is decreased gradually according to an increase in engine speed. The air conditioner operating condition detecting circuit 273, as discussed above, determines the drive torque of the air conditioner compressor 17 during use of the air conditioner 200 based on the motor current supplied to the air blower 24 and then corrects it according to the cooled air temperature, the outside temperature, and the engine speed, however, it may correct the drive torque using at least one of the correction coefficients $K_1$, $K_2$, and $K_3$.

Figure 4:
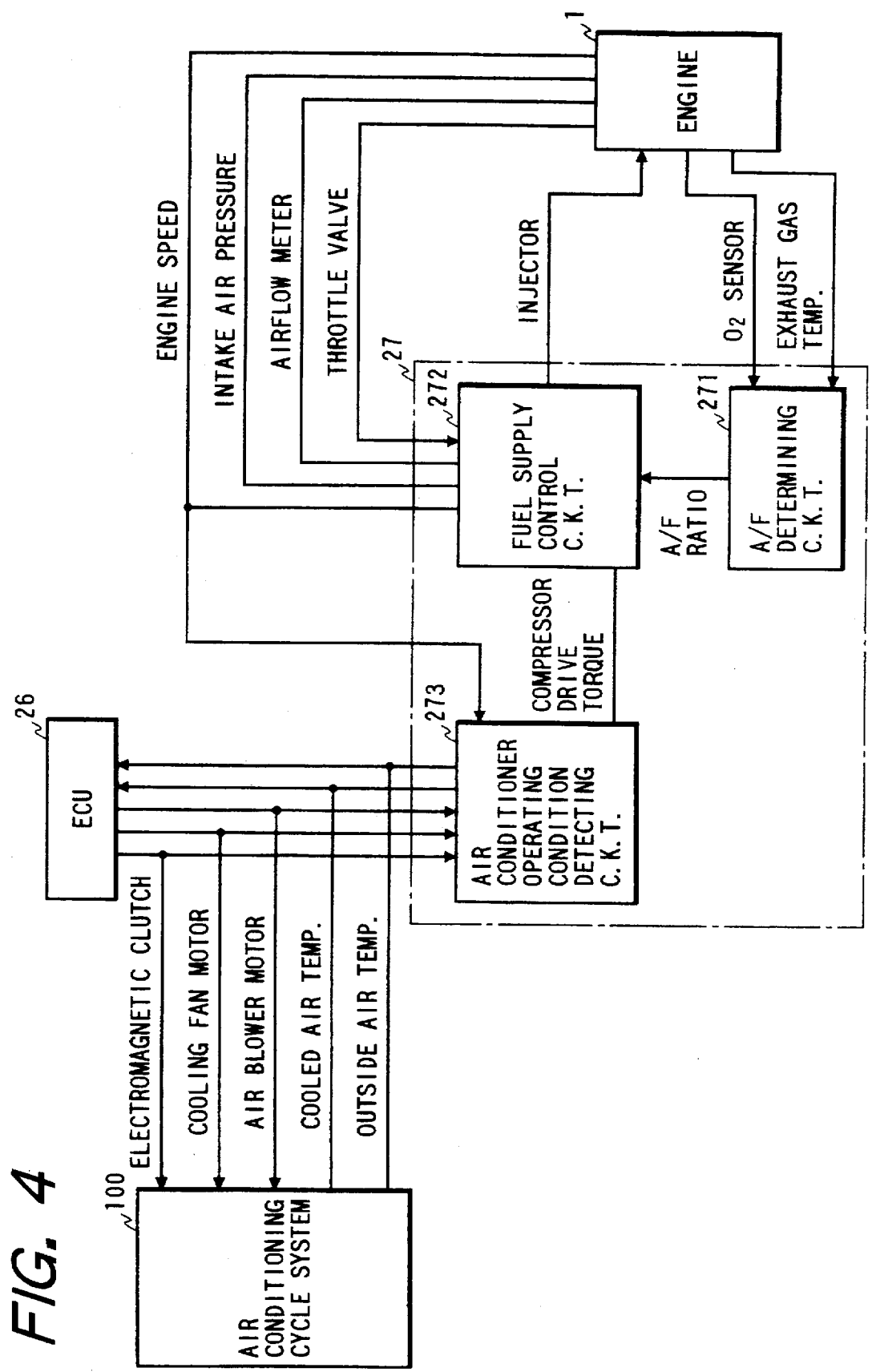
FIG. 4 is a circuit diagram which shows an air-fuel ratio control system of the invention.

FIG. 4 shows a circuit block diagram of the engine control system of the invention.

When the air conditioner 200 is not in use, the ECU 27 serves as a conventional engine control unit to control a supply of fuel through the fuel supply control circuit 272 so as to operate the engine 1 at a given air-fuel ratio predetermined according to engine operating conditions. In practice, an air-fuel ratio signal is outputted from the air-fuel ratio determining circuit 271 to the fuel supply control circuit 272, and then fed back thereto for achieving precise air-fuel ratio control. Thus, CO, HC, and NOx contained in exhaust gases are purged by the three way catalytic converter 16 to achieve optimum emission characteristics.

When the air conditioner 200 is in use, the air conditioner operating condition detecting circuit 273 of the ECU 27, as mentioned above, determines drive torque of the air conditioner compressor 17 driven by the engine 1 using the maps shown in FIGS. 3(a) to 3(d) based on an outside temperature as a parameter indicative of a cooling condition of the condenser 19 relative to a compression pressure level of the compressor 17 during operation, a current level of the motor control signal supplied to the air blower 24 as a parameter indicative of the amount of cooled air blown from the air conditioner 200 through the evaporator 22 corresponding to a cooling load, a cooled air temperature monitored by the cooled air temperature sensor 25, and an engine speed monitored by the engine speed sensor 28 corresponding to the speed of the air conditioner compressor 17. Thus, the drive torque of the air conditioner compressor 17 is projected with higher accuracy than that of conventional systems.

The fuel supply control circuit 272 then increases a supply of fuel through the injector 13 to the engine 1 to enrich air-fuel mixtures until a target air-fuel ratio is reached according to an increase in drive torque determined by the air conditioner operating condition detecting circuit 273 relative to load torque of the engine 1 during operation.

If the target air-fuel ratio is not reached, the air-fuel ratio detecting circuit 271 performs feedback control to correct the amount of fuel injected by the injector 13. Thus, even when the drive torque of the compressor 17 is varied transitionally, for example, during turning on and off of the electromagnetic clutch 18 or the compressor 17, the optimum emission control is achieved regardless of operating conditions of the air conditioner 200.

Figure 5:
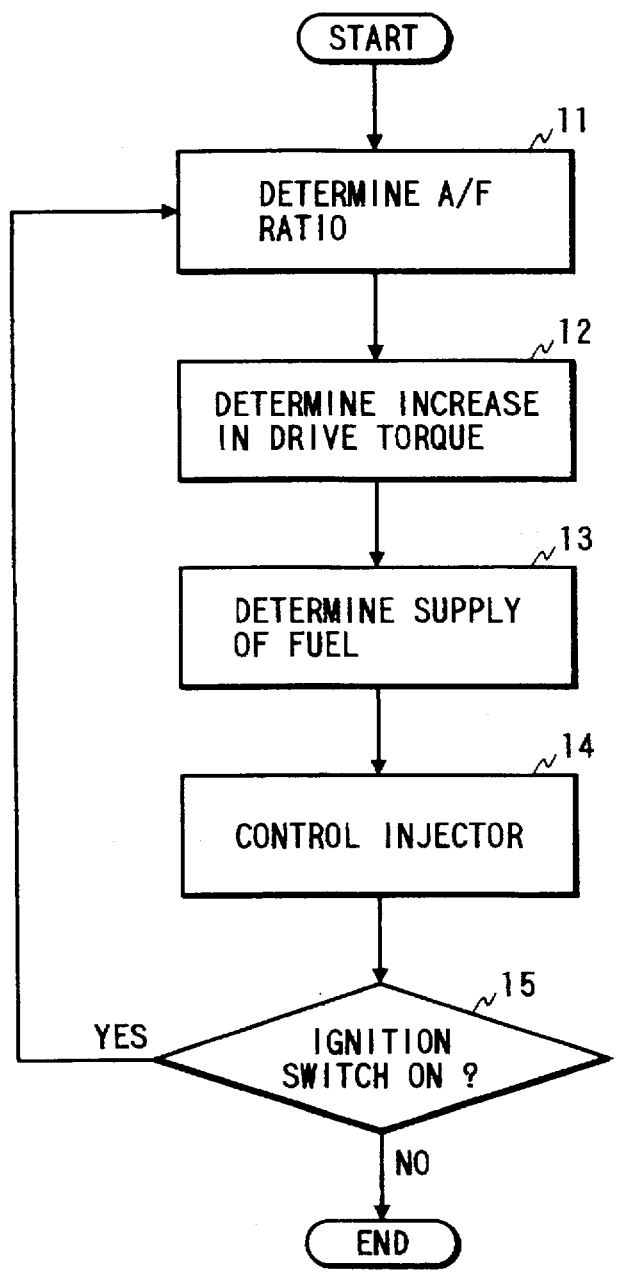
FIG. 5 is a flowchart which shows a program performed by a fuel supply control circuit FIGS. 6($a$) and 6($b$) are time charts which show operations of an electromagnetic clutch and an air conditioner compressor, respectively.

FIG. 5 shows a flowchart of a program performed by the fuel supply control circuit 272.

After entering the program, the routine proceeds to step 11 wherein an air-fuel ratio is determined based on outputs of the oxygen sensor 14 and the exhaust gas temperature sensor 15. The routine then proceeds to step 12 wherein an increase in drive torque of the compressor 17 determined by the air conditioner operating condition detecting circuit 273 is calculated. The routine then proceeds to step 13 wherein the amount of fuel supplied to the engine 1 is determined which is required to modify the air-fuel ratio determined in step 11 so as to meet a richer target air-fuel ratio selected according to the increase in drive torque determined in step 12. The routine then proceeds to step 14 wherein the injector 13 is controlled to supply the amount of fuel determined in step 13 to the engine 1. Subsequently, the routine proceeds to step 15 wherein it is determined whether an ignition switch is turned on or not. If a NO answer is obtained meaning that the engine is not in operation, then the routine terminates. Alternatively, if a YES answer is obtained, the routine returns back to step 11 so that feedback control is performed to correct the amount of fuel supplied by the injector 13 to meet the richer target air-fuel ratio for maintaining stable emission characteristics regardless of the operating conditions of the compressor 17.

FIGS. 6(a) to 6(d) are time charts for explanation of an operation of the ECU 27. FIG. 6(b) shows a variation in drive torque of the compressor 17 determined by the air conditioner operating condition detecting circuit 273 according to on-off operations of the electromagnetic clutch 18, as shown in FIG. 6(a). FIG. 6(c) shows a change in air-fuel ratio under the control of the ECU 27. FIG. 6(d) shows, as a typical example of emission characteristics, NOx contained in exhaust gas.

As apparent from the drawings, the drive torque of the compressor 17 rises in synchronization with the rising of an on-off signal of the electromagnetic clutch 18, and then is decreased gradually over time. According to the decrease in drive torque, the air-fuel ratio is stepwise modified to the rich side. The NOx contained in the exhaust gas is maintained at low levels, thereby achieving stable emission characteristics.

As a modification of the air conditioner operating condition detecting circuit 273, an intake pressure sensor and a compression pressure sensor may be provided in a refrigerant circuit around the compressor 17 for determining drive torque of the compressor 17 using sensor signals thereof. Usually, drive torque of an air conditioner compressor may be calculated based on a compressor capacity and intake and compression pressures. Therefore, in this embodiment, drive torque of the compressor 17 may be projected precisely based on sensor signals of the intake pressure sensor and the compression pressure sensor regardless of operating conditions of the air conditioner 200 so that the fuel supply control circuit 272 enriches the air-fuel mixture according to the drive torque of the compressor 17 for achieving the optimum emission characteristics.

While the air conditioner operating condition detecting circuit 273 explained so far determines the drive torque of the compressor 17 continuously to enrich the air-fuel mixture through the fuel supply control circuit 272, it may determine a plurality of drive torque levels of the compressor 17 intermittently according to operating conditions of the air conditioner to enrich the air-fuel mixture in stepwise fashion. This may also realize the optimum emission control.

Figure 7:
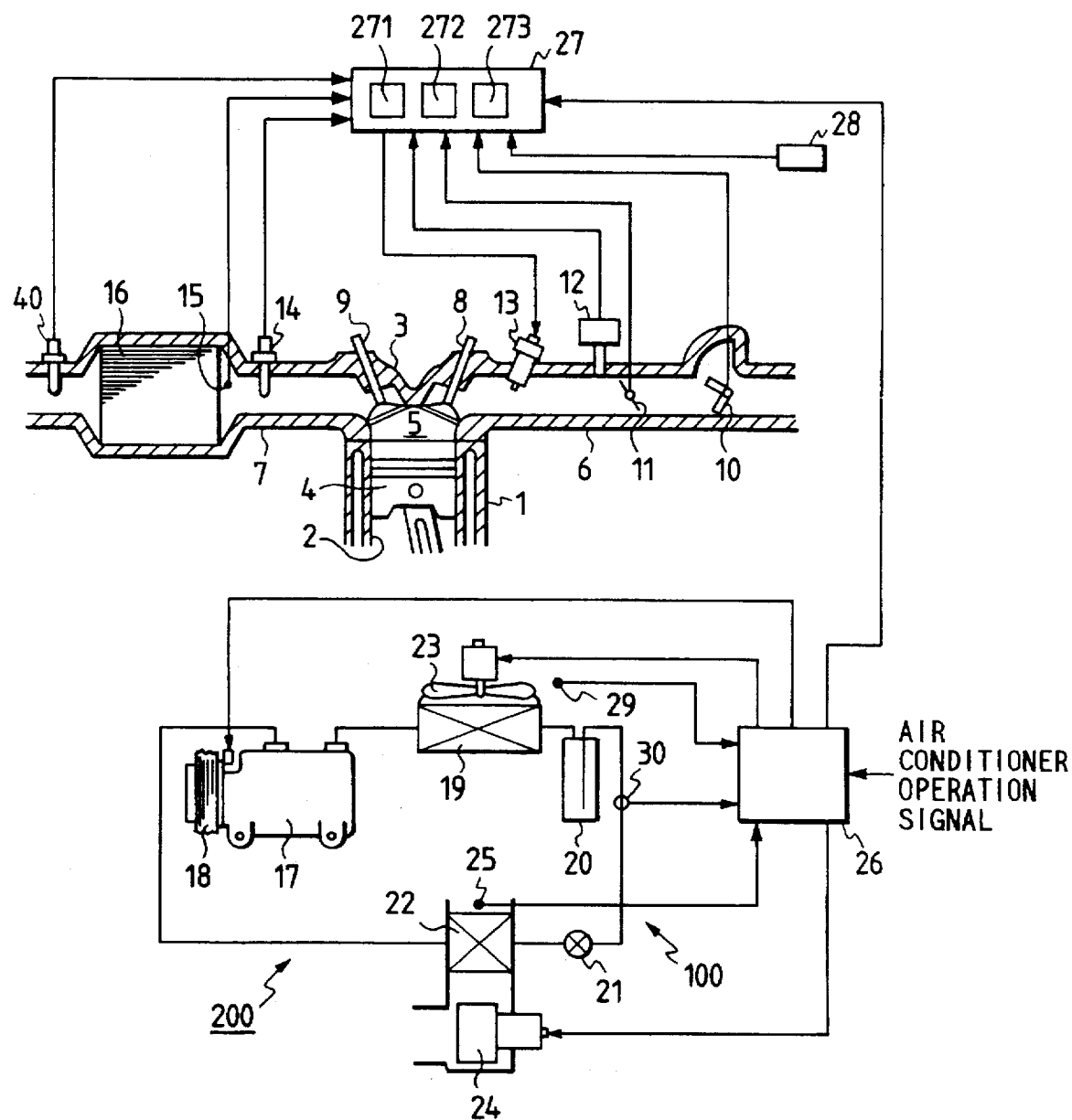
FIG. 7 is a schematic diagram which shows a modification of an air-fuel ratio control system used with a two-$O_2$ sensor system.

FIG. 7 shows the A/F control system of the invention according to a second embodiment which is used with a two-$O_2$ sensor system.

The same reference numbers as employed in FIG. 1 refer to same parts, and explanation thereof in detail will be omitted here.

The A/F control system shown includes an upstream oxygen ($O_2$) sensor 14 and a downstream $O_2$ sensor 40 located downstream of the catalytic converter 16. The A/F control system feedback-controls an air-fuel ratio using an output of the upstream $O_2$ sensor 14 and a learning control using an output of the downstream $O_2$ sensor 40 for compensating for mechanical degradation of the upstream $O_2$ sensor 14. The modification of the mixture supplied to the engine, to the rich side, is accomplished by shifting learned values derived under the learning control.

Figure 9A:
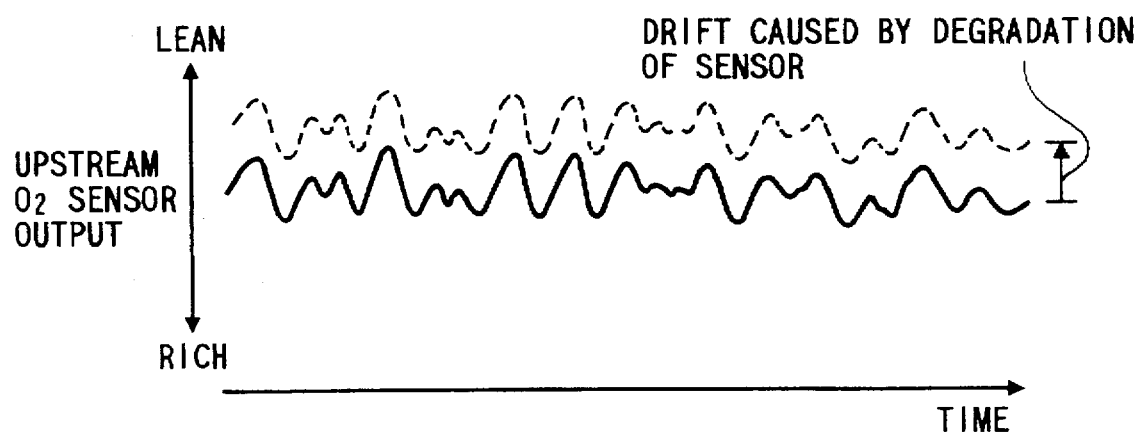
FIGS. 9($a$) and 9($b$) are time charts which show variations in output from an upstream $O_2$ sensor and a downstream $O_2$ sensor, respectively.
Figure 9B:
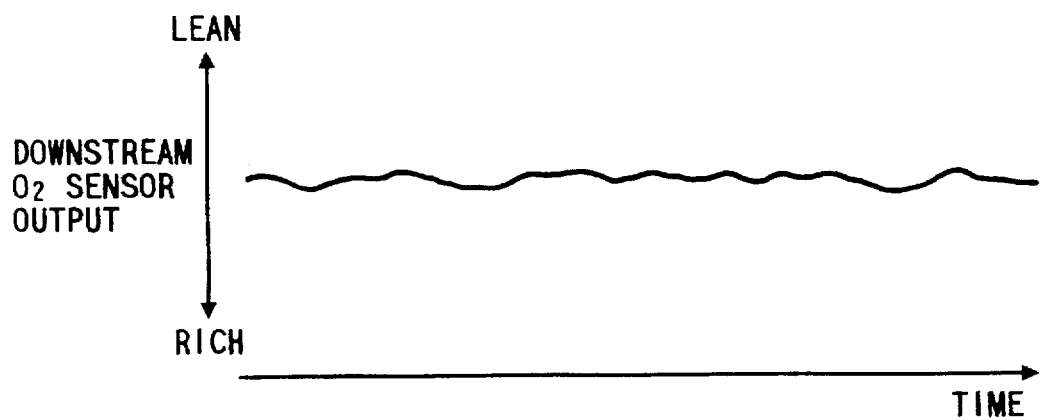

FIG. 8 shows a flowchart of a program performed by the A/F control system of the second embodiment. FIGS. 9(a) and 9(b) show waveforms of output signals from the upstream and downstream $O_2$ sensors 14 and 40, respectively.

Usually, the upstream $O_2$ sensor 14 is degrades mechanically because it is always subjected to high-temperature exhaust gases. As shown in FIG. 9(a), the output from the upstream $O_2$ sensor 14 drifts due to degradation over with time. To avoid this drawback, the A/F control system of the second embodiment uses an output from the downstream $O_2$ sensor 40 to compensate for the drift of the output from the upstream $O_2$ sensor 14. Note that the downstream $O_2$ sensor 40 is hardly degraded, as shown in FIG. 9(b), because the temperature of exhaust gases downstream of the catalytic converter 16 is usually lower than the temperature of exhaust gases upstream of the catalytic converter. Since a variation in concentration of $O_2$ downstream of the catalytic converter 16, as apparent from FIG. 9(b), is smaller than that of $O_2$ upstream of the catalytic converter 16, outputs of the downstream $O_2$ sensor 40 may be considered to show a mean air-fuel ratio at all times. Therefore, a correction factor for air-fuel ratio may be determined by comparing the average of outputs from the upstream $O_2$ sensor 14 with an instantaneous output from the downstream $O_2$ sensor 40. For example, the correction factor may be determined based on a difference between the average of outputs from the upstream $O_2$ sensor 14 and the output from the downstream $O_2$ sensor 40.

Referring to the flowchart shown in FIG. 8, upon initiation of the program, the routine proceeds to step 21 wherein an upstream air-fuel ratio is determined based on an output from the upstream $O_2$ sensor 14. The routine then proceeds to step 22 wherein a downstream air-fuel ratio is determined based on an output from the downstream $O_2$ sensor 40. The routine then proceeds to step 23 wherein it is determined whether the output (i.e., the average of the outputs) from the upstream $O_2$ sensor 14 is shifted over a given range or not due to the mechanical degradation of the sensor 14. If a NO answer is obtained, then the routine proceeds directly to step 25. Alternatively, if a YES answer is obtained, then the routine proceeds to step 24 wherein the correction factor is updated taking the mechanical degradation of the upstream $O_2$ sensor 14 into account. The routine then proceeds to step 25 wherein an air-fuel ratio is determined based on the correction factor.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An engine control apparatus for controlling an air-fuel ratio of an air-fuel mixture supplied to an engine during use of an air conditioner mounted on an automotive vehicle, comprising:

air-fuel ratio determining means for determining the air-fuel ratio of the air-fuel mixture supplied to the engine;

fuel supply means for supplying fuel to the engine so as to meet a given air-fuel ratio;

air conditioner operating condition determining means for determining a drive torque of a compressor used in the air conditioner, the compressor being driven by the engine during use of the air conditioner, the air conditioner operating condition determining means determining the drive torque of the compressor using a given relation to a value of an amount of current supplied to an air blower disposed in the air conditioner and correcting the determined drive torque to provide a corrected drive torque based on at least one of a plurality of parameters indicative of an air temperature cooled by the air conditioner, an outside air temperature, and an engine speed; and control means for controlling the fuel supply means to enrich the air-fuel mixture supplied to the engine so as to modify the air-fuel ratio determined by the air-fuel ratio determining means to a richer target air-fuel ratio according to an increase in the corrected drive torque of the compressor determined by the air conditioner operating condition determining means, the increase in the corrected drive torque being produced by an increase in load of the engine during use of the air conditioner.

2. An engine control apparatus as set forth in claim 1, further comprising:

upstream oxygen sensor for monitoring a concentration of oxygen contained in an exhaust gas upstream of a catalytic converter; and a downstream oxygen sensor for monitoring a concentration of oxygen contained in an exhaust gas downstream of the catalytic converter, wherein the control means determines an air-fuel ratio correction factor based on the concentrations of oxygen monitored by the upstream and the downstream oxygen sensors and modifies an amount of the fuel supplied to the engine based on the air-fuel ratio correction factor.

3. An engine control apparatus as set forth in claim 2, wherein the control means further comprises learning control means, using an output of the downstream oxygen sensor, for compensating for mechanical degradation of the upstream sensor.

4. An engine control apparatus as set forth in claim 3, wherein:

when an output of the upstream oxygen sensor is shifted the learning control means updates a correction factor, and he air-fuel ratio control means determines the air-fuel ratio based on the correction factor.

* * * * *